Nov. 8, 1955      N. D. TRIANTOS      2,722,748

MICROMETER HEIGHT GAUGE

Filed May 3, 1954

INVENTOR.
Nickolas D. Triantos
BY
Murray, Sackhoff & Murray
ATT'YS

United States Patent Office 2,722,748
Patented Nov. 8, 1955

2,722,748
MICROMETER HEIGHT GAUGE
Nickolas D. Triantos, Cincinnati, Ohio
Application May 3, 1954, Serial No. 427,247
5 Claims. (Cl. 33—170)

This invention relates to a micrometer height gauge and has for its main object an improved, readily portable micrometer gauge construction that is particularly useful with an extendable standard for accurately measuring relatively large sized work pieces, or the like, as compared with the maximum dimension measurable with the gauge alone.

Another object of the invention is to provide a novel extendable standard for the micrometer height gauge which is built up upon the extensible and retractible member of the gauge with a plurality of identically shaped units secured together in axial alignment by a separable, interchangeable connection that secures successive units together in the standard.

The above as well as other objects are attained by the gauge structure set forth in the accompanying drawing and more fully clarified in the following specification and pointed out in the appended claims.

Referring to the drawings.

Figure 1:
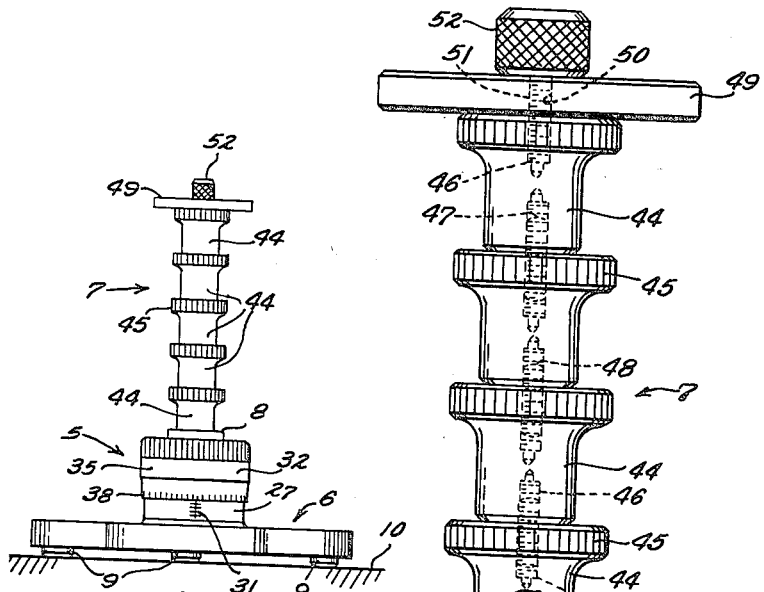
Fig. 1 is a front elevational view of my micrometer height gauge.

Referring in detail to the drawing the assembled micrometer height gauge shown in Fig. 1 generally comprises a micrometer screw device 5 supported upon a base 6 and carrying a composite, extendable standard 7 upon a platform 8 advanced and retracted by the micrometer screw 5. The base is a casting that is substantially kidney shaped in plan, said base being supported upon three feet 9 adapted to rest upon a surface plate or the machine 10 from which the height is to be measured. This base is provided with a cylindrical bore 11 formed therethrough perpendicular to the plane of the surface engaging faces of the feet 9.

Figure 2:
Fig. 2 is an enlarged, central section through the micrometer height gauge depicted in Fig. 1, the standard being shown in elevation and partly broken away to disclose underlying parts that are also shown in central section.
Figure 2:
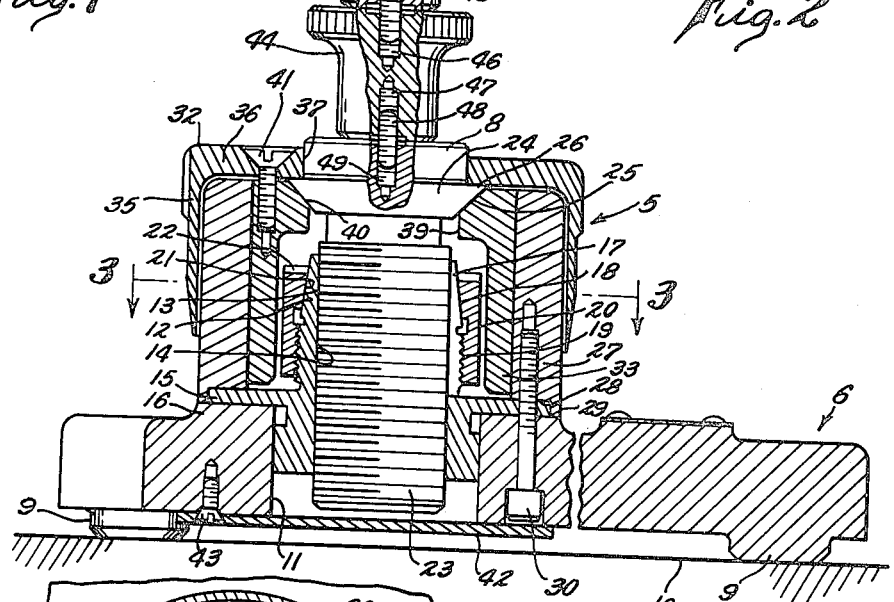
Figure 3:
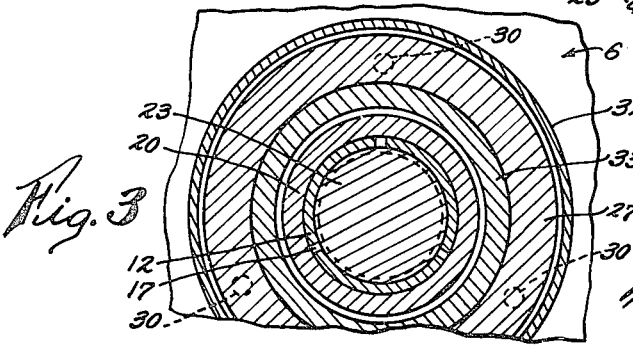
Fig. 3 is a section taken on line 3—3 of Fig. 2.

The micrometer screw device 5 comprises an upright collet 12 that has a generally cylindrical wall 13 provided with an internal micro-screw thread 14 over its entire extent. The lower portion of the collet is received in the bore 11 in the base, an intermediate part of the collet having formed thereon an outwardly extending circular mounting flange 15 which rests upon a ground raised portion 16 formed on the base around the bore 11. As best shown in Fig. 2 the upper end of the collet is sectionalized by a plurality of longitudinal slits 17 formed therethrough, the upper exterior surface of the collet being tapered at 18 whilst the lower surface merges with exterior threads 19 formed therein between the tapered end and the flange 15. An internally threaded adjusting nut 20 cooperates with the threads 19 on the collet, the nut having an internally tapered upper wall portion 21 that corresponds with the tapered surface 18 on the collet and is adapted to force the sectionalized collet end together when the internally tapered nut is drawn up on the collet by turning up on the nut with the use of a special spanner wrench that is engaged in slots 22 formed in the upper face of the nut.

An externally threaded lead screw 23 is fitted in the internal micro-screw threads 14 of the collet 12, said screw having the platform 8 formed integrally on its uppermost end to project upwardly beyond the body of the micrometer screw device 5 for purposes to be more fully described hereinafter. The platform 8 is preferably circular in plan and is positioned coaxially with the lead screw, said lead screw also having an annular shoulder 24 located at the base of the platform and occupying the major portion of the external space between said platform and the micro-threads 14. This annular shoulder is coaxial with the lead screw and is tapered to provide a downwardly converging circular bottom wall 25 and an upper circular wall 26 on said shoulder which meet at their outer peripheries in a relatively sharp corner 26. A cylindrical member or barrel 27 is mounted on the base concentric with and spaced radially outwardly from the collet 12 and the collet nut 14, said barrel having a concentric counterbore 28 formed in its bottom wall for closely receiving the collet flange 15. The counterbore 28 provides a downturned peripheral lip 29 on the barrel which engages upon the raised part 16 of the base, said barrel and collet being secured to the base by a series of bolts 30, countersunk in the base and passed vertically upwardly through holes in the flange 15 for threaded engagement at their upper ends in tapped holes formed in the body of the barrel 27. As best shown in Fig. 1 the outer face of the barrel has scribed therein a vertical micrometer scale 31.

The lead screw 23 has fixedly mounted thereon for rotation therewith a calibrated thimble 32 and a guide sleeve 33, the annular shoulder 24 serving as the common mounting element for both of said members. In this respect the thimble comprises a concentric skirt portion 35 which surrounds the barrel 27 and a circular top wall 36 that is provided with a centrally disposed opening 37 which closely fits around the base portion of the platform 8. The opening 37 on the thimble is smaller than the shoulder 24 thereby permitting the top wall portion of the thimble around the opening to engage upon the top circular wall 26 of said shoulder. As best shown in Fig. 1 the lower marginal edge portion of the skirt is reduced in thickness and has scribed therearound the horizontal micrometer scale 38 which is read in relation to the vertical scale 31 on the barrel 27.

The guide sleeve 33 is coaxial with the lead screw and is disposed between the barrel and the collet, the outer cylindrical face of the guide sleeve being fitted in close sliding engagement with the internal wall of the barrel 27 whilst said sleeve is spaced away from contact with the collet. The guide sleeve has a central opening 39 in its upper end, said opening being formed by an upwardly facing, outwardly flaring wall 40 which is in contact with the tapered bottom wall 25 on the lead screw shoulder 24. The thimble and the guide sleeve are clamped to the tapered shoulder 24 by draw up means such as screws 41, countersunk in the top wall 36 of the thimble and threaded in tapped holes formed in the sleeve 33. A dust plate 42 may be fastened by screws 43 to the bottom of the base to close off the bore 11 therein.

The extendable composite standard 7 is mounted upon the platform 8 and comprises a number of identical gauge blocks 44 preferably cylindrical in shape and each having a knurled shoulder 45 on one end concentric with the block proper. As best shown in Fig. 2 each block has an internally threaded concentric bore 46 and 47 formed through its upper and lower face, respectively, two adjacent blocks being secured together by an externally threaded stud 48 that cooperates with both threads when the blocks are relatively turned by manipulating them with the aid of their knurled shoulders. The lowermost block in the stack is secured to the platform 8 by one of the threaded studs 48 which is threaded in an internally threaded bore 49 formed axially in the platform and into the threaded bore 47 in the bottom of said lowermost block.

As will be readily understood a plurality of blocks 44 are provided with each micrometer screw and base unit 5 and the set usually packaged for ready portability in a suitable chest. These blocks are all of a standard unitary length such as one (1) inch in overall longitudinal dimension, whilst the micrometer device is adapted to measure up to a maximum dimension in excess of one (1) inch beginning with a minimum measurement height of (3) three inches from the surface plate 10. Thus when the measurement of a work piece is to be taken, my gauge is set at its zero reading, and the standard 7 is built up on the platform 8 with the unit blocks 44 to within (1) one inch of the actual height of the work piece, it then being only necessary to adjust the micrometer device till a reading on the gauge taken in conjunction with the total number of blocks in the built up standard will give the actual dimension of the work piece.

The numeral 49 indicates a reverse plate for taking reverse measurements, said plate having a threaded hole 50 therein for receiving a set screw 51 having a knurled knob 52. The plate may be secured to the standard when needed by threading the set screw into the threaded bore 47 in the block built up on the platform to the nearest (1) one inch.

It is to be particularly noted that I have provided a micrometer screw device that will support a relatively long extendable standard thereon and be accurate over the maximum extendable length to within .0001". This is principally due to the fact that the extendable and retractable platform and integral screw are guided against all lateral displacement by the closely fitted sliding connection between the micrometer barrel 27 mounted on the base 6 of the device and the guide sleeve 33 fixed on and rotatable with the screw. In this respect I have also provided an adjustment nut which can be readily tightened on the sectionalized end of the collet 20 to take up any wear occurring between the micro-threads on the screw 23 and the internal threads 14 in the collet. Further it is much simpler to produce the relatively small cylindrical block units 44 with great precision thus assuring extremely small tolerance for my series or number of blocks built up on the gauge platform to a required standard height. The particular inverted bell shapes of the blocks 44 also provides in any length of standard built therefrom a series of top block faces that are each in a plane normal to the axis of the standard and which present circular work reference surfaces that are parallel throughout their extent with the surface plate 10 for the gauge.

I have illustrated and described my invention in a practical embodiment thereof and have not attempted to disclose other adaptations or embodiments which I contemplate as I believe this specification and drawings will enable those skilled in the art to construct or adapt my invention as may be desired.

What is claimed is:

1. A micrometer height gauge comprising a base, an upright collet fixedly mounted upon the base and having an internally threaded, cylindrical wall formed therein, a lead screw threaded in the collet and having a platform extending upwardly therefrom, a calibrated barrel fixedly mounted upon the base concentric with, and spaced outwardly from the collet, a downturned externally calibrated thimble fixed coaxially on the lead screw and skirting the barrel, a guide sleeve fixed coaxially on the lead screw and disposed between the collet and the barrel, the external wall of the said sleeve having a close sliding fit with the internal wall of the barrel, and an extendable composite standard mounted upon the platform coaxially with the lead screw.

2. A micrometer height gauge comprising a base, an upright collet fixedly mounted on the base and having an internally threaded cylindrical wall formed therein, a lead screw having a lower portion threaded in the collet and having a coaxially positioned platform formed on its upper end, a shoulder formed coaxially on the lead screw intermediate the platform and the threaded portion, a calibrated barrel fixedly mounted upon the base concentric with, and spaced outwardly from the collet, a downturned externally calibrated thimble skirting the barrel and having a top wall engaged upon the shoulder and provided with a concentric opening for closely receiving the platform, a guide sleeve coaxial with the lead screw and disposed between the collet and the barrel with the external wall of the sleeve fitted in close sliding engagement with the internal wall of the barrel, said sleeve having an annular top wall provided with a concentric opening for receiving the underside of the shoulder on the lead screw, a draw up means between the two said top walls for clamping the thimble and guide sleeve to the lead screw, and an extendable composite standard mounted upon the platform coaxially with the lead screw.

3. A micrometer height gauge as set forth in claim 2 characterized by the fact that the shoulder has a downwardly tapering, annular wall and the hole in the guide sleeve is formed by an annular, upwardly flaring wall that engages against an intermediate portion of the said downwardly tapering wall of the shoulder.

4. A micrometer height gauge as set forth in claim 3 further characterized by the fact that the draw up means is a circular row of screws disposed concentrically beyond the shoulder on the lead screw, said screws being countersunk in the top wall of the thimble and threaded in tapped holes formed in the top wall of the guide sleeve.

5. A micrometer height gauge comprising a base having an opening formed therethrough, a collet having a flange extending outwardly from an intermediate part of its body, the flange engaging upon that portion of the base surrounding the hole therein, said collet having an internally threaded, cylindrical wall formed axially therethrough, a lead screw threaded in the collet and having a platform extending upwardly therefrom, a calibrated barrel having an inset portion for receiving the flange, and a marginal skirt surrounding the flange and in engagement with the base, a lock screw passing upwardly through the base and the flange and threaded in the barrel, said barrel being thereby fixedly mounted to the base concentric with, and spaced outwardly from the collet, a downturned internally calibrated thimble fixed coaxially on the lead screw and skirting the barrel, a guide sleeve fixed coaxially on the lead screw and disposed between the collet and the barrel, the external wall of the said sleeve having a close sliding fit with the internal wall of the barrel, and an extendable composite standard mounted upon the platform coaxially with the lead screw.

References Cited in the file of this patent

UNITED STATES PATENTS

| | | |
|---|---|---|
| 2,562,935 | Minch | Aug. 7, 1951 |

FOREIGN PATENTS

| | | |
|---|---|---|
| 219,503 | Great Britain | July 31, 1924 |
| 125,908 | Sweden | Aug. 30, 1949 |